(12) United States Patent
Hosabettu et al.

(10) Patent No.: US 9,373,048 B1
(45) Date of Patent: Jun. 21, 2016

(54) METHOD AND SYSTEM FOR RECOGNIZING CHARACTERS

(71) Applicant: Wipro Limited, Bangalore (IN)

(72) Inventors: Raghavendra Hosabettu, Bangalore (IN); Anil Kumar Lenka, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/636,929

(22) Filed: Mar. 3, 2015

(30) Foreign Application Priority Data

Dec. 24, 2014 (IN) .......................... 6520/CHE/2014

(51) Int. Cl.
*G06K 9/00* (2006.01)
*G06K 9/18* (2006.01)
*G06K 9/46* (2006.01)
*G06K 9/62* (2006.01)
*G06T 7/00* (2006.01)

(52) U.S. Cl.
CPC ............... *G06K 9/18* (2013.01); *G06K 9/4604* (2013.01); *G06K 9/6201* (2013.01); *G06T 7/0083* (2013.01)

(58) Field of Classification Search
None
See application file for complete search history.

(56) References Cited

U.S. PATENT DOCUMENTS

| 5,267,332 | A * | 11/1993 | Walch | G06K 9/4638 382/198 |
| 5,588,072 | A * | 12/1996 | Wang | G06K 9/00442 382/176 |
| 7,724,956 | B2 * | 5/2010 | Walch | G06K 9/344 382/181 |
| 8,452,108 | B2 * | 5/2013 | Walch | G06K 9/00872 382/203 |
| 2005/0163377 | A1 * | 7/2005 | Walch | G06K 9/00154 382/187 |
| 2008/0247674 | A1 * | 10/2008 | Walch | G06K 9/344 382/305 |
| 2008/0253659 | A1 * | 10/2008 | Walch | G06K 9/00161 382/186 |
| 2015/0055866 | A1 * | 2/2015 | Cummins | G06K 9/344 382/176 |
| 2015/0125041 | A1 * | 5/2015 | Burry | G06K 9/34 382/105 |
| 2015/0269431 | A1 * | 9/2015 | Haji | G06K 9/00879 382/186 |

* cited by examiner

*Primary Examiner* — Sean Motsinger
(74) *Attorney, Agent, or Firm* — LeClairRyan, a Professional Corporation

(57) ABSTRACT

The present disclosure relates to a method and a system for recognizing characters. In one embodiment, the input image comprising one or more characters to be recognized is received and processed to extract one or more nodes and edges of each character in the input image. Using the extracted nodes and edges, a graphical representation and adjacency matrix of each character is generated and compared with a predetermined graphical representation and adjacency matrix to determine a match. Based on the comparison, a matching probability is determined based on which one or more characters in the input image is recognized and displayed as output. The proposed recognition method and system recognizes character with more accuracy and speed. Further, the present disclosure is simple, cost-effective and reduces the complexity involved in automatic recognition of characters.

9 Claims, 4 Drawing Sheets

A
Figure 1b
A
Figure 1c
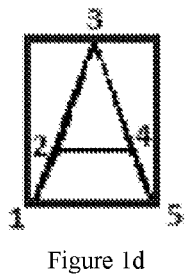
Figure 1d
| Node | 1 | 2 | 3 | 4 | 5 |
|---|---|---|---|---|---|
| 1 | 0 | 1 | 0 | 0 | 0 |
| 2 | 1 | 0 | 1 | 1 | 0 |
| 3 | 0 | 1 | 0 | 1 | 0 |
| 4 | 0 | 1 | 1 | 0 | 1 |
| 5 | 0 | 0 | 0 | 1 | 0 |
Figure 1f
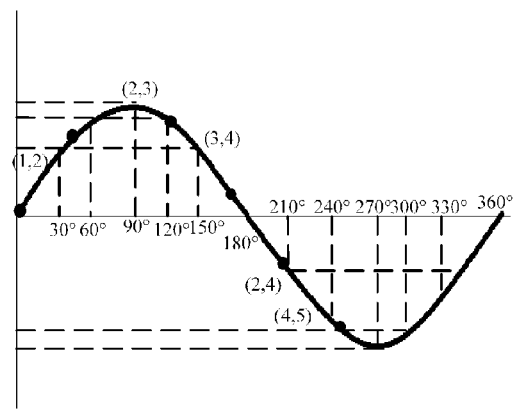
Figure 1e
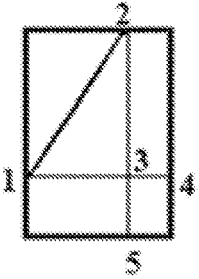
Figure 1i
4
Figure 1g
4
Figure 1h
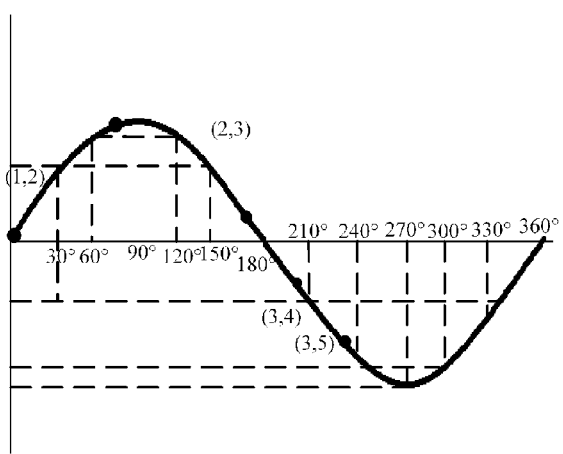
Figure 1j
| Node | 1 | 2 | 3 | 4 | 5 |
|---|---|---|---|---|---|
| 1 | 0 | 1 | 1 | 0 | 0 |
| 2 | 1 | 0 | 1 | 0 | 0 |
| 3 | 1 | 1 | 0 | 1 | 1 |
| 4 | 0 | 0 | 1 | 0 | 0 |
| 5 | 0 | 0 | 1 | 0 | 0 |
Figure 1k

METHOD AND SYSTEM FOR RECOGNIZING CHARACTERS

This application claims the benefit of Indian Patent Application Serial No. 6520/CHE/2014 filed Dec. 24, 2014, which is hereby incorporated by reference in its entirety.

FIELD

The present subject matter is related, in general to a recognition method and a recognition system, and more particularly, but not exclusively to method and system for recognizing characters.

BACKGROUND

Generally available character recognition techniques like optical character recognition (OCR) is used to automatically convert written, printed or if desired even handwritten texts into a data form that can be electronically processed or computer readable form. The characters being recognized are optically scanned and binarized to create into a suitable form for analyzing and transformed into an electronic form for further processing. Various feature recognition techniques are known for examining and recognizing characters based on predetermined patterns stored in memory of an electronic device. However, these known techniques depend heavily on standardized fonts or approximations thereof. Further, there exist problems in identifying characters due to magnification, reduction or rotation, different lighting condition, resolution limitation, perspective distortions, arbitrary orientation and bad quality of characters, and non-uniform illumination conditions during image acquisition.

Therefore, there is a need to provide a method and a system to recognize characters automatically.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a recognition method. In one embodiment, the method comprising the step of receiving an input image comprising one or more characters from an image sensor. The received input image is then processed to extract one or more nodes and edges of each character in the input image and a graphical representation of each character is generated based on the one or more edges. The method further comprising comparing the graphical representation of each character with a predetermined graphical representation of each reference character stored in a reference repository. Based on the comparison, the characters in the input image are recognized.

Further, the present disclosure relates to a recognition system comprising an image sensor and a processor coupled with the image sensor. The system further comprises a memory communicatively coupled to the processor, wherein the memory stores processor-executable instructions, which, on execution, cause the processor to receive an input image comprising one or more characters from the image sensor. Further, the processor is configured to extract one or more nodes and edges of each character from the input image and generate a graphical representation of each character based on the one or more edges. The system further comprises a comparison unit coupled with the processor and configured to compare the graphical representation of each character with the predetermined graphical representation of each reference character stored in a reference repository. Furthermore, the system comprises a recognition unit coupled with the comparison unit and configured to recognize the reference character as one of the characters in the input image based on the comparing.

Furthermore, the present disclosure relates to a non-transitory computer readable medium including instructions stored thereon that when processed by at least one processor cause a system to perform the act of receiving an image comprising one or more characters. Further, the instructions cause the processor to perform the acts of extracting one or more nodes and edges of each character from the input image and generating a graphical representation of each character based on the one or more edges. Furthermore, the instructions cause the processor to perform the acts of comparing the generated graphical representation of each character with the predetermined representation of each reference character stored in a reference repository and recognizing the reference character as one of the characters in the input image based on the comparing.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIGS. 1b-1k illustrate a graphical representation and adjacency matrix of exemplary characters in accordance with some embodiments of the present disclosure;

Figure 1A:
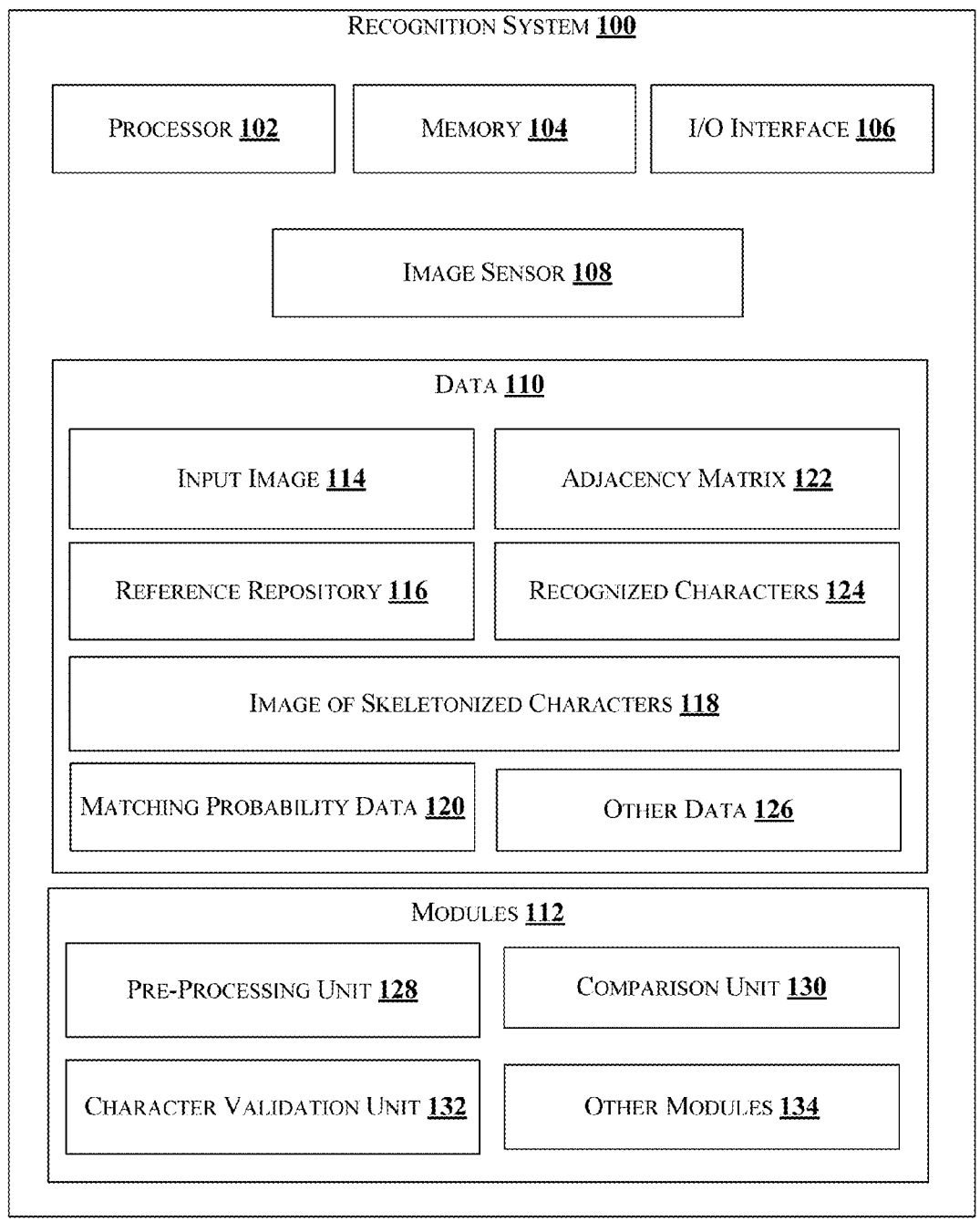
FIG. 1a illustrates a block diagram of a recognition system for recognizing characters in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method, and a system for recognizing characters. In one embodiment, the input image comprising one or more characters to be recognized is received and processed to extract one or more nodes and edges of each character in the input image. Using the extracted nodes and edges, a graphical representation and adjacency matrix of each character is generated and compared with a predetermined graphical representation and adjacency matrix to determine a match. Based on the comparison, a matching probability is determined based on which one or more characters in the input image is recognized and displayed as output. The proposed recognition method and system recognizes character with more accuracy and speed. Further, the present disclosure is simple, cost-effective and reduces the complexity involved in automatic recognition of characters.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates block diagram of recognition system 100 for recognizing characters automatically in accordance with some embodiments of the present disclosure.

The recognition system 100 is configured to recognize characters printed, handwritten or captured by an image capturing device or image sensor. For example, the recognition system 100 may be used to automatically recognize characters on number plate of automobiles or vehicles during motion.

The recognition system is described in greater details below with reference to FIG. 1. In one implementation, the exemplary recognition system 100 includes a central processing unit ("CPU" or "processor") 102, the memory 104 and an I/O interface 106. The I/O interface 106 is coupled with the processor 102 and an I/O device. The I/O device is configured to receive inputs via the I/O interface 106 and transmit outputs for displaying in the I/O device via the I/O interface 106. The recognition system 100 further comprises an image sensor 108 coupled with the processor 102 and configured to capture an input image comprising one or more characters for recognition.

The recognition system 100 also comprises data 110 and modules 112. In one implementation, the data 110 and the modules 112 may be stored within the memory 104. In one example, the data 110 may include input image 114, reference repository 116, image of skeletonized character 118, matching probability data 120, adjacency matrix 122, recognized characters 124 and other data 126. In one embodiment, the data 110 may be stored in the memory 104 in the form of various data structures. Additionally, the aforementioned data can be organized using data models, such as relational or hierarchical data models. The other data 126 may be used to store data, including temporary data and temporary files, generated by the modules 112 for performing the various functions of the recognition system 100.

The modules 112 may include, for example, a pre-processing and feature extracting unit (hereinafter referred to as pre-processing unit) 128, a comparison unit 130, and a character validation unit 132. The modules 112 may also comprise other modules 134 to perform various miscellaneous functionalities of the recognition system 100. It will be appreciated that such aforementioned modules may be represented as a single module or a combination of different modules.

In operation, the image sensor 108 captures the input image 114 comprising one or more characters in a capture frame like a rectangular mask. The image sensor 108 may be for example, a still/video camera, a camera in a mobile device or any other known image capturing devices. The input image 114 comprises one or more frames captured for a predetermined time for example, comprises 'n' frames per second. Each frame of the input image 114 is hereinafter referred to as input image 114. The input image 114 is an image with resolution limitation or having background images that may cross the text or characters or create graphic noise, with changing light intensity, or an image captured from arbitrary view point having perspective distortion. In another embodiment, the image may have characters with different fonts, sizes, shapes, styles and thickness, shadows, text embossed, geometric distortions, and image resolution limitation or may be of bad quality. The input image 114 is pre-processed by the pre-processing unit 128 to remove image resolution limitations and to extract one or more predetermined features used for recognition of characters in the input image 114.

In one embodiment, the pre-processing unit 128 pre-processes the input image 114 by removing background or graphical noise from the input image 114 using any known filters and converting the filtered input image 114 in RGB format into a corresponding grayscale format. The pre-processing unit 128 detects the boundary of the number plate in the input image 114 by using any known boundary detection techniques to locate the images of the characters. The number plates may be generally rectangular in shape with dark characters on a light/bright background, for example black fonts on white background and may have characters of same or different size. The number plates may also have a fixed ratio of width to height relationship. In one embodiment, the pre-processing unit 128 analyses the input image 114, determines the extent of intensity variation of each row and selects the adjacent rows that exhibit the maximum variation to contain the characters of the number plate. The pre-processing unit 128 further determines the borders of the input image 114 by detecting the edges of the input image 114 using any edge detection technique.

In one aspect, the pre-processing unit 128 determines the horizontal and vertical edges using Hough Transformation technique for example, and extracts the number plate based on the determined edges. Further, the pre-processing unit 128 processes the extracted number plate input image 114 for skewing/slant correction using known skew/slant correction techniques. Upon skewing/slant correcting the input image 114, the pre-processing unit 128 detects the orientation of the input image 114 and resizes the dimensions of the extracted number plate input image 114 based on detected orientation. In one embodiment, the pre-processing unit 128 detects the orientation of the number plate input image 114 and aligns the input image 114 using a bounding box. Upon correcting the orientation, the dimensions of the input image 114 is altered by the pre-processing unit 128 to a predetermined size.

The pre-processing unit 128 is further configured to locate the characters of interest for example, one or more characters in the number plate and extract the corresponding images. In one embodiment, the pre-processing unit 128 identifies the location of the number plate and extracts images of each alphanumeric character from the identified location. The pre-processing unit 128 extracts images of each character by segmenting the input image 114 using any known segmentation techniques. In one embodiment, the pre-processing unit 128 converts the gray scale input image 114 into a corresponding binary image using a predetermined adaptive threshold value. Upon conversion, the pre-processing unit 128 extracts one or more characters from the input binary image 114 by computing horizontal projections on the input binary image 114 to obtain horizontal image segments and further computing vertical projections on the horizontal image segments to obtain the one or more image segments of the one or more characters of the input image 114. Upon segmentation, the pre-processing unit 128 generates skeletonized image segments of each character to extract one or more features representing a general form of the characters as shown in FIG. 1b.

In one embodiment, the pre-processing unit 128 normalizes the dimensions of the character contained in the image segments using techniques including Nearest-neighbor or weighted average method of down sampling to generate one or more normalized characters. The pre-processing unit 128 further extracts appropriate descriptors from the one or more normalized characters, performs structural analysis from the extracted descriptors and extracts region-based shaped features representing the general form of the character.

Upon obtaining each skeletonized character, the pre-processing unit 128 generates graphical representation and adjacency matrix of each skeletonized character 118. In one embodiment, the pre-processing unit 128 converts each skeletonized character 118 into a graphical representation comprising one or more nodes and edges using a bounding box and edge detection techniques known in the art. Upon conversion, the pre-processing unit 128 extracts the one or more nodes and the edges using a bounding box in clockwise direction for example as illustrated in FIG. 1c. Based on the extracted nodes and edges, wave graph of each character is generated using the extracted edges and corresponding graphical ending position angle is determined. In one example, the pre-processing unit 128 generates sine wave graph of each character using the extracted edges only once per each edge and determines sine wave ending position angle for each character. For example, the pre-processing unit 128 plots each character onto the sine wave graph by plotting the extracted edges of each character on the sine wave graph and determining the sine wave ending position angle of the plotted edges. Further, the pre-processing unit 128 determines adjacency matrix 122 for each character based on the nodes and edges extracted in the clockwise direction. A sample illustration of sine wave graph of letter 'A' and digit '4' is shown in FIGS. 1a-1j.

The recognition system 100 recognizes one or more characters of the input image 114 by comparing it with a previously stored reference characters in the reference repository 116. In one embodiment, the reference repository is predetermined and stored in the memory 104. The pre-processing unit 128 pre-processes images of one or more characters including for example, digits, capital alphabet letters, small alphabet letters and special characters by removing noise and converts the image in RGB format into its corresponding grayscale format. The images are then normalized, re-sampled to create images of equal dimensions, and skeletonized to extract region-based shape feature representing the general form of the characters. Further, the location of the characters in the input image is detected and identified. The images are then converted into graphical representation comprising one or more nodes and edges based on which graph wave ending position angle and adjacency matrix are determined and stored for each reference characters.

The recognition system 100 recognizes characters in the input image 114 of the number plate based on the graphical representation and the adjacency matrix 122 of each character in the input image 114. In one embodiment, the recognition system 100 recognizes characters in the input image 114 by comparing each character in the input image 114 with each of the reference character in the reference repository 116. The comparison unit 130 compares the sine wave ending position angle of each skeletonized characters 118 in 'n' frames of the input image 114 with the sine wave ending position angle of one or more reference characters in the reference repository 116 and further compares the adjacency matrix 122 of the character in 'n' frames of the input image 114 with the adjacency matrix of the reference character. If all the characters of 'n' frames of the input image 114 match with the reference characters, then the reference characters are identified and recognized as characters in the input image 114. If at least one character of 'n' frames of the input image 114 is not matching with the reference characters, then the unmatched character is recognized based on the matching probability data 120 of the unmatched character.

In one embodiment, the character validation unit (hereinafter referred to as validation unit) 132 determines the matching probability data 120 of the at least one unmatched character and recognizes the at least one unmatched character of the input image 114 based on the matching probability data 120. If the validation unit 132 determines that the matching probability data 120 exceeds a predetermined matching probability threshold data stored in the other data 126, then the validation unit 132 selects the reference character as recognized character in the input image 114 and displays the selected character as output. If the validation unit 132 determines that the matching probability data 120 of the unmatched character does not exceed the predetermined matching probability threshold data, then the validation unit 132 discards the matching probability data 120 of the unmatched character and repeats the entire process.

Figure 2:
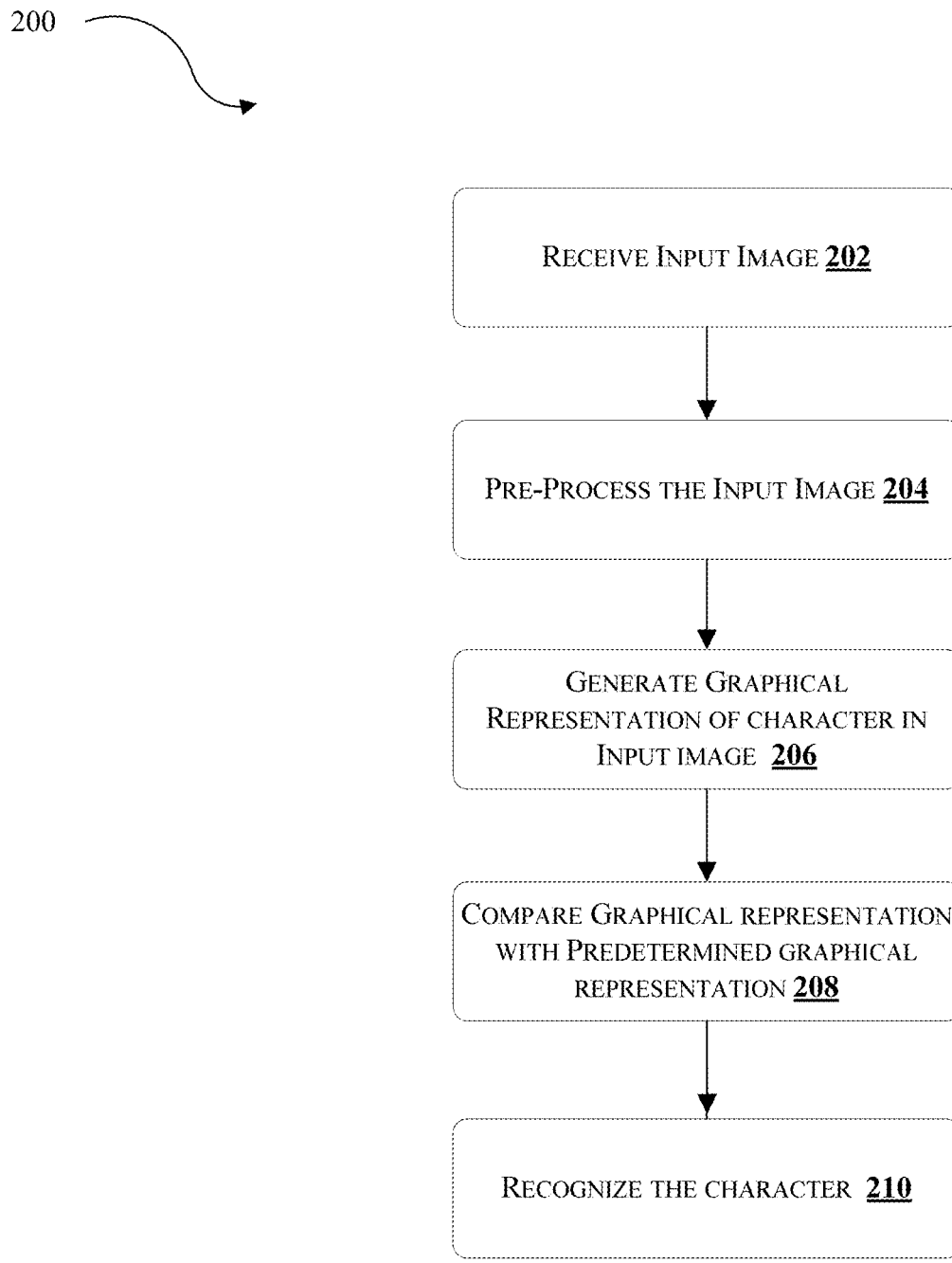
FIG. 2 illustrates a flowchart of a method of recognizing characters in accordance with some embodiments of the present disclosure.

FIG. 2 illustrates a flowchart of a method of recognizing characters in accordance with some embodiments of the present disclosure.

As illustrated in FIG. 2, the method 200 comprises one or more blocks implemented by the processor 102 for recognizing characters. The method 200 may be described in the general context of computer executable instructions. Generally, computer executable instructions can include routines, programs, objects, components, data structures, procedures, modules, and functions, which perform particular functions or implement particular abstract data types.

The order in which the method 200 is described is not intended to be construed as a limitation, and any number of the described method blocks can be combined in any order to implement the method 200. Additionally, individual blocks may be deleted from the method 200 without departing from the spirit and scope of the subject matter described herein. Furthermore, the method 200 can be implemented in any suitable hardware, software, firmware, or combination thereof.

At block 202, receive input image. In one embodiment, the image sensor 108 captures the input image 114 comprising one or more characters in a capture frame like a rectangular mask. The image sensor 108 may be for example, a still/video camera, a camera in a mobile device or any other known image capturing devices. The input image 114 is an image with resolution limitation or having background images that may cross the text or characters or create graphic noise, with changing light intensity, or an image captured from arbitrary view point having perspective distortion. In another embodiment, the image may have characters with different fonts, sizes, shapes, styles and thickness, shadows, text embossed, geometric distortions, and image resolution limitation or may be of bad quality.

At block 204, pre-process the input image. The input image 114 is pre-processed by the pre-processing unit 128 to remove image resolution limitations and to extract one or more predetermined features used for recognition of characters in the input image 114. In one embodiment, the pre-processing unit 128 pre-processes the input image 114 by removing background or graphical noise from the input image 114 using any known filters and converting the filtered input image 114 in RGB format into a corresponding grayscale format. The pre-processing unit 128 detects the boundary of the number plate in the input image 114 by using any known boundary detection techniques to locate the images of the characters. The number plates may be generally rectangular in shape with dark characters on a light/bright background, for example black fonts on white background and may have characters of same or different size. The number plates may also have a fixed ratio of width to height relationship. In one embodiment, the pre-processing unit 128 analyses the input image 114, determines the extent of intensity variation of each row and selects the adjacent rows that exhibit the maximum variation to contain the characters of the number plate. The pre-processing unit 128 further determines the borders of the input image 114 by detecting the edges of the input image 114 using any edge detection technique.

In one aspect, the pre-processing unit 128 determines the horizontal and vertical edges using Hough Transformation technique for example, and extracts the number plate based on the determined edges. Further, the pre-processing unit 128 processes the extracted number plate input image 114 for skewing/slant correction using known skew/slant correction techniques. Upon skewing/slant correcting the input image 114, the pre-processing unit 128 detects the orientation of the input image 114 and resizes the dimensions of the extracted number plate input image 114 based on detected orientation. In one embodiment, the pre-processing unit 128 detects the orientation of the number plate input image 114 and aligns the input image 114 using a bounding box. Upon correcting the orientation, the dimensions of the input image 114 is altered by the pre-processing unit 128 to a predetermined size.

The pre-processing unit 128 is further configured to locate the characters of interest for example, one or more characters in the number plate and extract the corresponding images. In one embodiment, the pre-processing unit 128 identifies the location of the number plate and extracts images of each alphanumeric character from the identified location. The pre-processing unit 128 extracts images of each character by segmenting the input image 114 using any known segmentation techniques. In one embodiment, the pre-processing unit 128 converts the gray scale input image 114 into a corresponding binary image using a predetermined adaptive threshold value. Upon conversion, the pre-processing unit 128 extracts one or more characters from the input binary image 114 by computing horizontal projections on the input binary image 114 to obtain horizontal image segments and further computing vertical projections on the horizontal image segments to obtain the one or more image segments of the one or more characters of the input image 114. Upon segmentation, the pre-processing unit 128 generates skeletonized image segments of each character to extract one or more features representing a general form of the characters as shown in FIG. 1c.

In one embodiment, the pre-processing unit 128 normalizes the dimensions of the character contained in the image segments using techniques including Nearest-neighbor or weighted average method of down sampling to generate one or more normalized characters. The pre-processing unit 128 further extracts appropriate descriptors from the one or more normalized characters, performs structural analysis from the extracted descriptors and extracts region-based shaped features representing the general form of the character.

At block 206, generate graphical representation of character in the input image. Upon obtaining each skeletonized character, the pre-processing unit 128 generates graphical representation and adjacency matrix of each skeletonized character 118. In one embodiment, the pre-processing unit 128 converts each skeletonized character 118 into a graphical representation comprising one or more nodes and edges using a bounding box and edge detection techniques known in the art. Upon conversion, the pre-processing unit 128 extracts the one or more nodes and the edges using a bounding box in clockwise direction for example as illustrated in FIG. 1d. Based on the extracted nodes and edges, wave graph of each character is generated using the extracted edges and corresponding graphical ending position angle is determined. In one example, the pre-processing unit generates sine wave graph of each character using the extracted edges only once per each edge and determines sine wave ending position angle for each character. Further, the pre-processing unit 128 determines adjacency matrix 122 for each character based on the nodes and edges extracted in the clockwise direction. A sample illustration of sine wave graph of letter 'A' and digit '4' is shown in FIGS. 1b-1k.

At block 208, compare graphical representation with predetermined graphical representation. In one implementation, the recognition system 100 recognizes characters in the input image 114 of the number plate based on the graphical representation and the adjacency matrix 122 of each character in the input image 114. In one embodiment, the recognition system 100 recognizes characters in the input image 114 by comparing each character in the input image 114 with each of the reference character in the reference repository 116. The comparison unit 130 compares the sine wave ending position angle of each skeletonized characters 118 in 'n' frames of the input image 114 with the sine wave ending position angle of one or more reference characters in the reference repository 116 and further compares the adjacency matrix 122 of the character in 'n' frames of the input image 114 with the adjacency matrix of the reference character. If all the characters of 'n' frames of the input image 114 match with the reference characters, then the reference characters are identified and recognized as characters in the input image 114. If at least one character of 'n' frames of the input image 114 is not matching with the reference characters, then the unmatched character is recognized based on the matching probability data 120 of the unmatched character.

At block 210, recognize the character. In one embodiment, the character validation unit 132 determines the matching probability data 120 of the at least one unmatched character and recognizes the at least one unmatched character of the input image 114 based on the matching probability data 120. If the validation unit 132 determines that the matching probability data 120 exceeds a predetermined matching probability threshold data stored in the other data 126, then the validation unit 132 selects the reference character as recognized character in the input image 114 and displays the selected character as output. If the validation unit 132 determines that the matching probability data 120 of the unmatched character does not exceed the predetermined matching probability threshold data, then the validation unit 132 discards the matching probability data 120 of the unmatched character and repeats the entire process.

Figure 3:
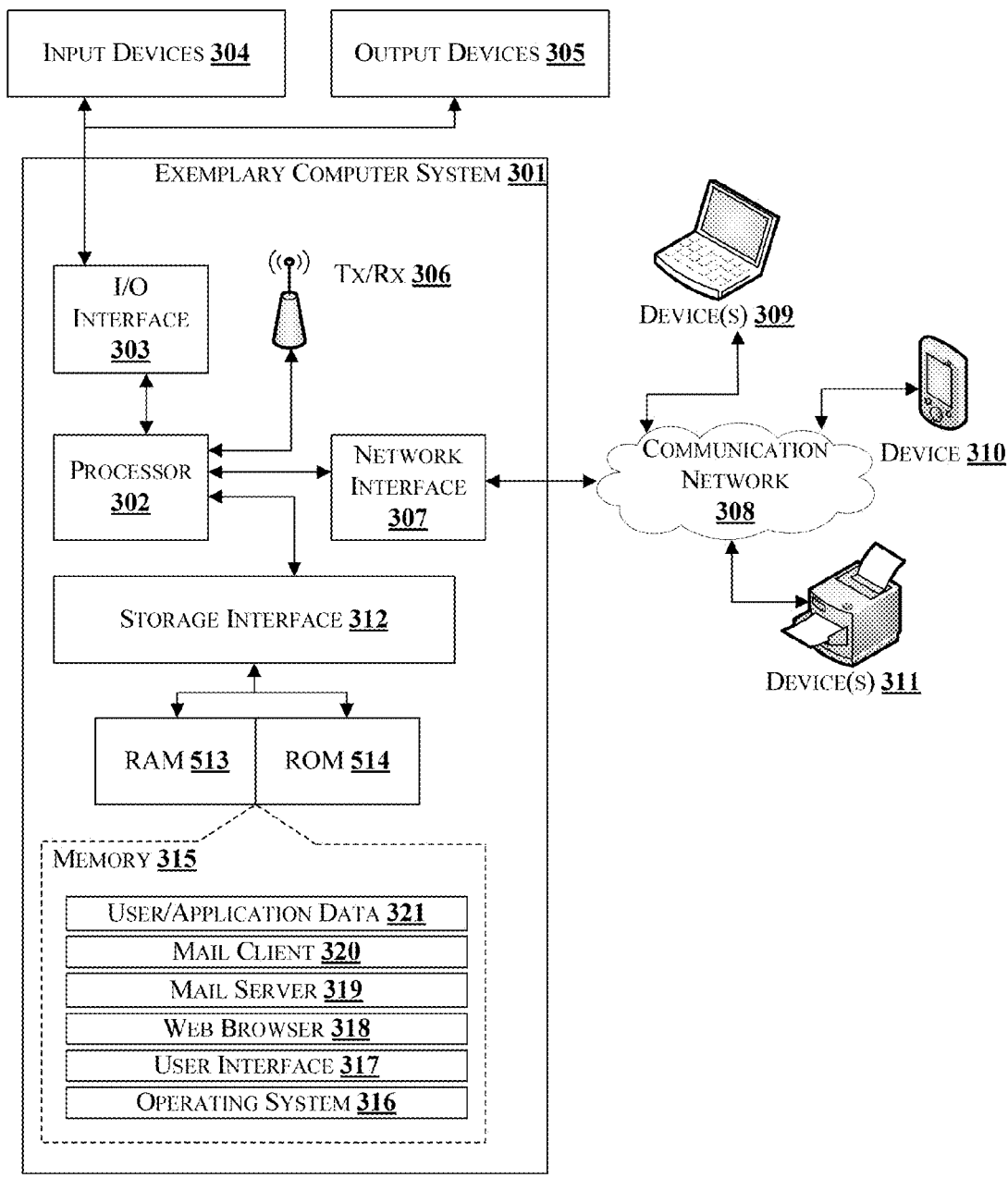
FIG. 3 is a block diagram of an exemplary computer system for implementing embodiments consistent with the present disclosure.

FIG. 3 is a block diagram of an exemplary computer system for implementing embodiments consistent with the present disclosure.

Variations of computer system 301 may be used for implementing all the computing systems that may be utilized to implement the features of the present disclosure. Computer system 301 may comprise a central processing unit ("CPU" or "processor") 302. Processor 302 may comprise at least one data processor for executing program components for executing user- or system-generated requests. The processor may include specialized processing units such as integrated system (bus) controllers, memory management control units, floating point units, graphics processing units, digital signal processing units, etc. The processor 302 may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface 307 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 309, 310, and 311. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 315 may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As described above, the modules 112, amongst other things, include routines, programs, objects, components, and data structures, which perform particular tasks or implement particular abstract data types. The modules 112 may also be implemented as, signal processor(s), state machine(s), logic circuitries, and/or any other device or component that manipulate signals based on operational instructions. Further, the modules 112 can be implemented by one or more hardware components, by computer-readable instructions executed by a processing unit, or by a combination thereof.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A recognition method, comprising:
   receiving, by a processor, from an image sensor of a recognition system, an input image comprising one or more characters;
   preprocessing, by the processor, the input image before extracting one or more nodes and edges of each character from the input image, the pre-processing comprising the steps of:
   detecting a boundary of the input image;
   identifying a location of each character based on the boundary of the image;
   segmenting the image of each character into one or more image segments from the location; and
   skeletonizing the one or more image segments of each character to generate one or more features representing a general form of the character;
   extracting, by the processor, the one or more nodes and edges of each character in the input image;
   generating, by the processor, a graphical representation of each character based on the one or more edges, wherein generating the graphical representation of each character comprises the steps of:
   generating the graphical representation using the edges of each skeletonized character; and
   determining the graphical wave ending position angle of each skeletonized character from the respective graphical representation thus generated;
   comparing, by the processor, the generated graphical representation of each character with the predetermined graphical representation of each reference character stored in a reference repository; and
   recognizing, by the processor, the reference character as one of the characters in the input image based on the comparing.

2. The method as claimed in claim 1, further comprising creating the reference repository, wherein creating the reference repository comprising the steps of:
- pre-processing an image of one or more characters;
- extracting one or more nodes and edges of each skeletonized character;
- generating the graphical representation and adjacency matrix for each skeletonized character using the one or more nodes and edges; and
- storing the graphical representation and the adjacency matrix in a memory coupled with the processor.

3. The method as claimed in claim 1, wherein comparing the generated graphical representation of each character with the predetermined graphical representation of the reference character, comprising the steps of:
- comparing the graphical wave ending position angle of each skeletonized character with the graphical wave ending position angle of each reference character;
- determining an adjacency matrix for each skeletonized character based on the one or more nodes; and
- comparing the adjacency matrix of each skeletonized character with the adjacency matrix of the reference character.

4. The method as claimed in claim 1, wherein recognizing characters of the input image comprising the steps of:
- selecting one or more skeletonized characters matching with each reference character as recognized characters of the input image upon comparing the graphical wave ending position angle and adjacency matrix of each skeletonized character with the graphical wave ending position angle and adjacency matrix of the reference character;
- determining at least one unmatched character and determining a matching probability data of at least one unmatched character;
- comparing the matching probability data of at least one unmatched character with a predetermined matching probability threshold; and
- selecting the reference character as recognized character in the input image based on comparing.

5. A recognition system comprising:
- an image sensor;
- a processor coupled with the image sensor;
- a memory communicatively coupled to the processor, wherein the memory stores processor-executable instructions, which, on execution, cause the processor to:
- receive, from the image sensor, an input image comprising one or more characters;
- pre-process the input image before extracting one or more nodes and edges of each character from the input image, the pre-processing comprising the steps of:
- detecting a boundary of the input image;
- identifying a location of each character based on the boundary of the input image;
- segmenting image of each character into one or more image segments from the location; and
- skeletonizing the one or more image segments of each character to generate one or more features representing the general form of the character;
- extract the one or more nodes and edges of each character from the input image; and
- generate a graphical representation of each character based on the one or more edges, wherein generating the graphical representation of each character comprises the steps of:
- generating the graphical representation using the edges of each skeletonized character; and
- determining the graphical wave ending position angle of each skeletonized character from the respective graphical representation thus generated;
- a comparison unit coupled with the processor and configured to compare the graphical representation of each character with a predetermined graphical representation of each reference character stored in a reference repository; and
- a validation unit coupled with the comparison unit and configured to recognize the reference character as one of the characters in the input image based on the comparing.

6. The system as claimed in claim 5, wherein the instructions, on execution, further cause the processor to create the reference character repository by:
- pre-processing an image of one or more characters including at least alphabets, numbers and special characters;
- extracting one or more nodes and edges of each skeletonized character;
- generating the graphical representation and adjacency matrix for each skeletonized character using the one or more extracted nodes and edges; and
- storing the graphical representation and the adjacency matrix in the memory.

7. The system as claimed in claim 5, wherein the instructions, on execution, cause the comparison unit to compare the generated graphical representation of each character with the predetermined graphical representation of the reference character by:
- comparing the graphical wave ending position angle of each skeletonized character with the graphical wave ending position angle of each reference character;
- determining an adjacency matrix for each character based on the one or more nodes; and
- comparing the adjacency matrix of each skeletonized character with that of the reference character.

8. The system as claimed in claim 5, wherein the instructions, on execution, further cause the validation unit to recognize the one or more characters of the input image by:
- selecting one or more skeletonized characters matching with each reference character as recognized characters of the input image upon comparing the graphical wave ending position angle and adjacency matrix of each skeletonized character with the graphical wave ending position angle and adjacency matrix of the reference character;
- determining at least one unmatched character and determining a matching probability data of at least one unmatched character;
- comparing the matching probability data of at least one unmatched character with a predetermined matching probability threshold; and
- selecting the reference character as recognized character in the input image based on comparing.

9. A non-transitory computer readable medium including instructions stored thereon that when processed by at least one processor cause a system to perform acts of:
- receiving an input image comprising one or more characters;
- preprocessing the input image before extracting one or more nodes and edges of each character from the input image, the pre-processing comprising the steps of:
- detecting a boundary of the input image;
- identifying a location of each character based on the boundary of the image;

segmenting the image of each character into one or more image segments from the location; and skeletonizing the one or more image segments of each character to generate one or more features representing a general form of the character;

extracting one or more nodes and edges of each character from the input image;

generating a graphical representation of each character based on the one or more edges, wherein generating the graphical representation of each character comprises the steps of:

generating the graphical representation using the edges of each skeletonized character; and determining the graphical wave ending position angle of each skeletonized character from the respective graphical representation thus generated;

comparing the generated graphical representation of each character with the predetermined representation of each reference character stored in a reference repository; and recognizing the reference character as one of the characters in the input image based on the comparing.

\* \* \* \* \*